Dec. 19, 1967  V. H. B. WILHITE  3,358,932
DIRECTIONAL CONTROL FOR ROCKETS

Filed June 16, 1965  2 Sheets-Sheet 1

INVENTOR.
VERBON H. B. WILHITE
BY
Curtis, Morris & Safford
ATTORNEYS

*INVENTOR.*
VERBON H.B. WILHITE
*BY*
*Curtis, Morris + Safford*
ATTORNEYS

United States Patent Office 3,358,932
Patented Dec. 19, 1967

3,358,932
DIRECTIONAL CONTROL FOR ROCKETS
Verbon H. B. Wilhite, Brigham City, Utah, assignor to Thiokol Chemical Corporation, Bristol, Pa.
Filed June 16, 1965, Ser. No. 464,506
3 Claims. (Cl. 239—265.43)

ABSTRACT OF THE DISCLOSURE

Disclosure relates to a construction in a rocket engine vehicle having angularly related motor operated devices for selectively deforming different sides of a flexible nozzle to change the effective direction of its axis relative to the axis of the engine for steering the vehicle.

---

This invention relates to means for controlling the direction of gas-jet propelled vehicles; and, particularly, to devices for achieving such control by deforming the nozzles for the gas jets of such vehicles.

A number of devices have been proposed and used for controlling trajectories of gas-jet propelled vehicles such as rockets. These devices include small secondary rockets to provide direction-changing thrust, movable nozzles, vanes placed in rocket exhaust gases, and injection of secondary fluids into rocket nozzles. Each of these devices is subject to one or more of the following limitations: (1) exposure of vital, moving parts to the erosive action of exhaust gases, (2) weight penalty of heavy tanks of fluid, (3) aerodynamic drag on the rocket, and (4) mechanical complexity and weight.

The present invention, which essentially comprises selective deformation of a hollow, flexible, divergent cone of a rocket nozzle, overcomes many of the disadvantages of previous devices for steering a rocket. It is relatively light in weight and simple in construction.

Although not restricted to such use, its high degree of reliability makes it especially useful in small motors for adjusting trajectories of satellites and other space vehicles.

It is, therefore, an object of the invention to provide a control system having simple, light-weight, and reliable construction for steering rockets or other gas-jet propelled vehicles.

Another object of the invention is to provide a rocket-control system wherein no moving parts are exposed to the propulsive gases of the rocket.

Another object of the invention is to provide a rocket-control system that avoids the sealing problems inherent in many systems for rocket control.

Other objects and advantages of the invention will become apparent as the following detailed description is read with reference to the accompanying drawings, wherein the same parts are designated by identical characters throughout the views.

Figure 1:
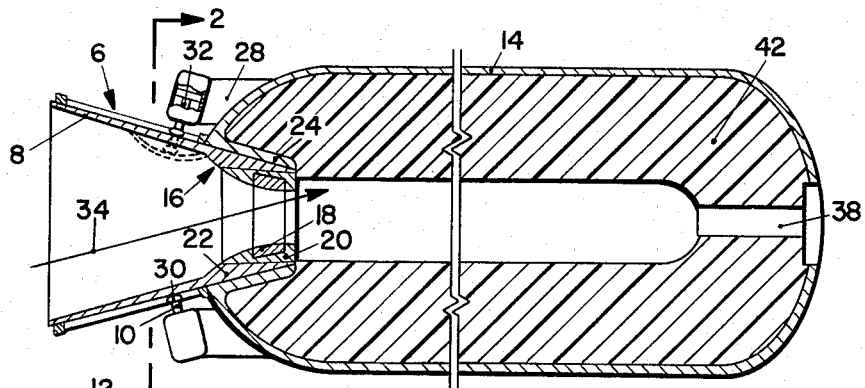
FIGURE 1 is a section taken along the central longitudinal axis of a rocket motor incorporating one embodiment of the invention and showing the deformable exit cone of the nozzle motor and a structure for selectively deforming the cone.

Referring to FIGURE 1, the rocket motor there shown comprises the usual elongated, generally cylindrical casing 14 having mounted at its rear end a nozzle 6 that includes a flexible, divergent exit cone 8 capable of being selectively deformed by means that will presently be described. The rocket nozzle 6 is of the "partially-submerged" type i.e., it is at least partially located within the envelope of the rocket motor casing 14. The submerged portion 16 of the nozzle 6 comprises the inner end 22 of exit cone 8 which is surrounded by a ring 24 of thermal insulation, a refractory throat annulus 18 of graphite, and refractory graphite supporting members 20. The exit cone 8 is made of a flexible, deformable material and any of various known materials having these properties may be used. One material that is satisfactory has the following composition in percent by weight:

| | Percent |
|---|---|
| Polyisoprene | 57.5 |
| Stearic acid | 1.7 |
| Zinc oxide | 3.9 |
| Sulphur | 1.4 |
| Asbestos fiber | 33.7 |
| N-cyclohexyl-2-benzothiozolsulfenamide | 1.0 |
| Styrenated phenol | 1.0 |
| | 100.0 |

This composition can be cured under conventional curing conditions.

The various silicone rubbers known to the art are also useful in forming exit cones for use in accordance with the present invention. Buna-N rubber filled with silica is another material advantageous for making flexible, yet heat resistant exit cones.

Figure 2:
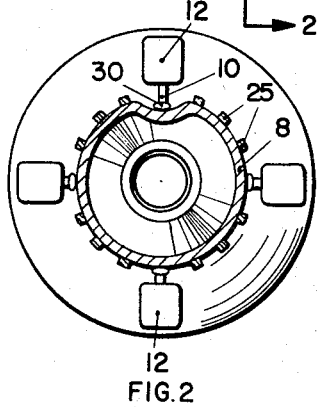
FIGURE 2 is a transverse section taken on line 2—2 of FIGURE 1 and further showing the cone-deforming devices.
Figure 3:
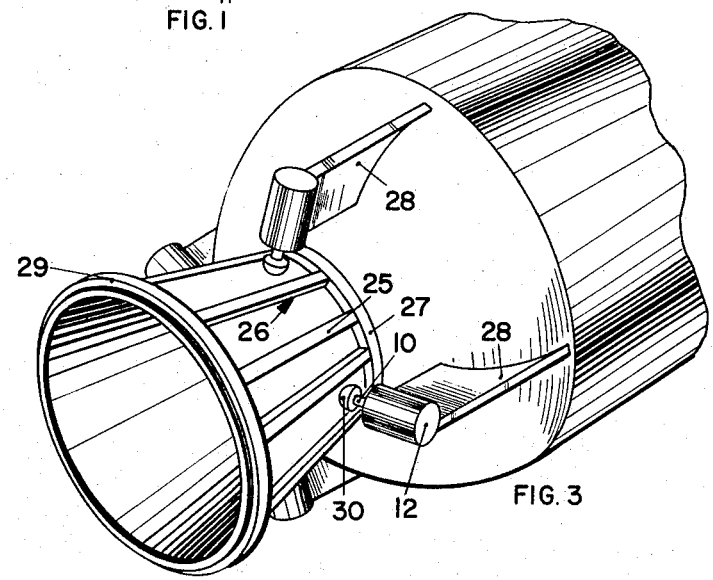
FIGURE 3 is a perspective view of the rear end of the motor of FIGURE 1 particularly showing the cage that supports the deformable exit cone of the motor nozzle.

Referring to FIGURES 2 and 3 as well as to FIGURE 1, the flexible exit cone 8 is supported by an external cage 26 comprising a series of longitudinal members 25 extending between an inner hoop 27 attached to cone 8 near the point at which it enters casing 14 and an outer hoop 29 attached to cone 8 near its discharge end. The cage 26 supports and stiffens the cone 8 sufficiently to prevent buckling or telescoping thereof under pressure of the propulsive gases.

Still referring to FIGURES 1 to 3, mounted on the rear end of casing 14 by means of brackets 28 there are four hydraulic cylinders 12 disposed approximately 90° apart. Each cylinder is oriented with its axis approximately perpendicular to the surface of the exit cone 8 of the nozzle 6. Within each cylinder there is a reciprocable piston 32 connected by a piston rod 10 to a rounded bearing member 30 positioned adjacent to the outer surface of exit cone 8. The hydraulic cylinders 12 may be actuated in response to a radio signal by well-known means (not shown) to deform the wall of exit cone 8 selectively, as indicated by the dotted lines in FIGURE 1 thereby altering the direction of the thrust vector created by the propulsive gases flowing through the nozzle as indicated by the arrow 34 in FIGURE 1.

The cylinders 12 may be mounted on the supporting brackets 28 or on some portion of the nozzle 6. The mounting, of course, must be such as to permit the desired deformation of the flexible exit cone 8. Mounting arrangements other than that shown may in fact be desirable if the nozzle 6 and cone-deforming devices are to be sold as a separate unit.

The main portion of the rocket motor may be of conventional construction. The casing 14 may be of the steel or fiberglass type containing a body of conventional solid propellant 42 and provided at its forward end with a conventional igniter 38. The only requirement of the propellant is that the exhaust products or propulsion gases therefrom be sufficiently cool and nonerosive so that the exit cone 8 will not be destroyed during the required time of operation. High-energy, solid propellants may be used for short time periods of the order of 10 seconds or less if the cone 8 is made of the composition cited above. Most of the commonly-termed "gas-generator" propellants may be used when longer periods of operation are necessary. A typical propellant formulation that may be used advantageously in a motor incorporating the present invention has the following composition in percent by weight:

| | Percent |
|---|---|
| Polybutadiene acrylic acid acrylonitrile terpolymer | 11.4 |
| Trifunctional epoxy resin | 2.6 |
| Triacetin | 7.5 |
| Guanidine nitrate (ground) | 5.0 |
| Sodium barbiturate (ground) | 1.0 |
| Ammonium nitrate | 72.5 |

The ingredients are mixed at approximately 150° F., and are cured by a heat treatment at 170° F., for approximately three days.

Figure 4:
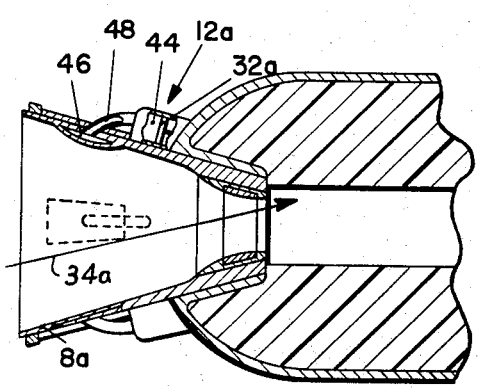
FIGURE 4 is an axial section, similar to FIGURE 1 taken through a rocket motor incorporating a modification of the structure of FIGURE 1 wherein the deformable exit cone is provided with inflatable bladders.

An alternative embodiment of the invention is illustrated in FIGURE 4 of the drawings. Referring to FIGURE 4, pistons 32a in four fluid-powered cylinders 12a, mounted in a manner generally similar to the cylinders 12 of FIGURE 1, are adapted to be actuated to push hydraulic fluid 44 through tubes 48 into bladders 46 or pockets 46 formed in the wall of the flexible exit cone 8a. Inflation of the pockets 46 by the hydraulic fluid 44 under pressure by the pistons 32a selectively deflects the thrust vector 34a in the same manner that the thrust vector 34 of FIGURE 1 may be deflected upon deformation of the exit cone 8 by the cylinders 12.

Figure 5:
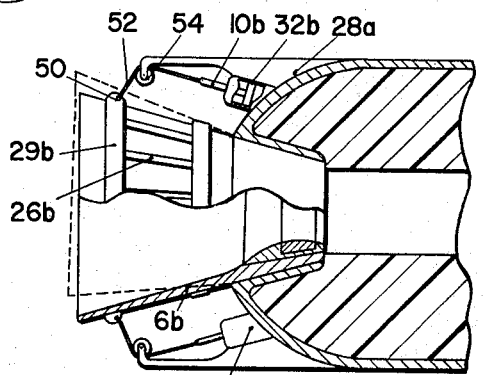
FIGURE 5 is an axial section, similar to FIGURE 1, taken through a rocket motor incorporating still another modification of the structure of FIGURE 1 wherein the rearward portion of the exit cone is selectively deflected.

A third embodiment of the invention is illustrated in FIGURE 5. Four hydraulic cylinders 12b mounted on brackets 28a and and equipped with pistons 32b and piston rods 10b are substantially equally spaced around the circumference of exit cone 6b. The piston rods 10b are connected by cables 52 to the eyes 50 of a hook 29b of supporting cage 26b. Pulleys 54 mounted on brackets 28b permit efficient use of the cylinders 12b by causing the portions of cables 52 extending between the pulleys and eyes 50 to be substantially perpendicular to the surface of exit cone 8b. In this embodiment, cylinders 12b are actuated to cause the rear portion of the flexible exit cone to be deflected and thereby change the thrust vector of the exit gas stream.

Figure 6:
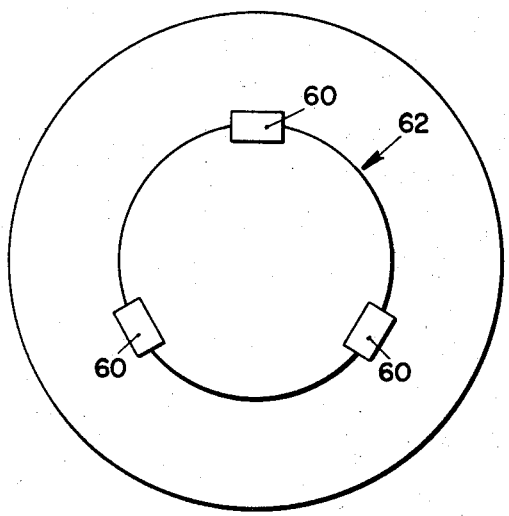
FIGURES 6 to 8 are diagrams illustrating several different arrangements of thrust-vector control devices according to the invention.
Figure 7:
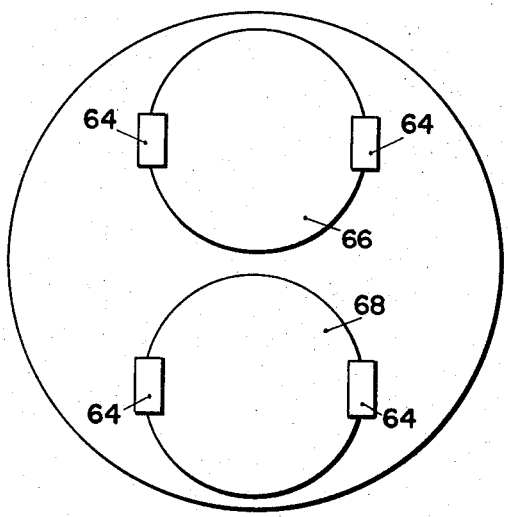
Figure 8:
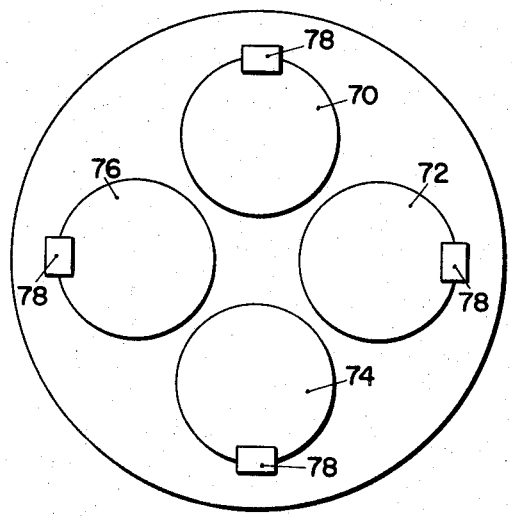

As illustrated in diagrams of FIGURES 6 to 8 different members and arrangements of the exit cone-deforming devices may be used depending on such factors as the number of nozzles on the rocket. FIGURE 6 illustrates an embodiment wherein three deforming devices 60 are equally spaced around a single nozzle 62. FIGURE 7 illustrates an embodiment wherein a pair of cone-deforming devices 64 is arranged diametrically in respect to each of two nozzles 66 and 68. In FIGURE 8 four nozzles 70, 72, 74 and 76 are indicated, each of which has a single cone-deforming device 78 associated therewith.

A novel apparatus and means has been described for steering rockets and other gas-jet operated vehicles. Although the preferred form and alternate forms of this invention have been described with considerably specificity, it should be noted that numerous alterations and equivalent means may be incorporated without departing from the spirit and scope of the invention. For example, although nozzles of the partially-submerged type have been illustrated and described, this feature is simply a convenience of design and is not essential to the use of the present invention.

I claim:

1. In a gas propelled rocket engine, a nozzle assembly comprising a refractory annular throat, a frame positioned rearwardly of the throat and having inner and outer rings with longitudinal members extending therebetween, a wall of flexible material diverging from said throat in said frame, and means for selectively deforming said diverging wall inwardly comprising a fluid motor having a piston and a piston rod connected to deform said flexible wall and thereby deflect gas flowing through said nozzle to steer said rocket engine.

2. A rocket engine having a nozzle assembly as defined in claim 1 wherein said piston rod is provided with a rounded portion adapted to bear against the external surface of said flexible wall between longitudinal members of said frame.

3. A rocket engine having a nozzle assembly as defined in claim 1 wherein said flexible wall has an expansible bladder therein, said means for selectively deforming said diverging wall comprising a source of pressure fluid connected to said bladder, and said motor being connected to force said fluid into said bladder and thereby selectively deforming said wall to change the thrust vector of gases passing through said nozzle.

References Cited

UNITED STATES PATENTS

| 2,625,008 | 1/1953 | Crook | 239—265.33 X |
| 3,024,599 | 3/1962 | Keen | 239—265.37 |
| 3,140,584 | 7/1964 | Ritchey et al. | 60—232 |
| 3,214,903 | 11/1965 | Cochran | 239—455 X |
| 3,229,457 | 1/1966 | Rowe et al. | 239—265.37 |
| 3,249,306 | 5/1966 | Altseimer | 239—265.43 X |
| 3,258,915 | 7/1966 | Goldberg | 60—232 |

M. HENSON WOOD, Jr., *Primary Examiner.*

V. C. WILKS *Assistant Examiner.*